United States Patent [19]
McConnachie et al.

[11] Patent Number: 5,372,798
[45] Date of Patent: Dec. 13, 1994

[54] FULLERENE COMPOSITIONS AND PREPARATION

[75] Inventors: Jonathan M. McConnachie, Flemington; Edward I. Stiefel, Bridgewater, both of N.J.

[73] Assignee: Exxon Research and Engineering Company, Florham Park, N.J.

[21] Appl. No.: 207,645

[22] Filed: Mar. 8, 1994

[51] Int. Cl.$^5$ .................. C01B 31/00; C01B 19/00; C01B 17/00; C01B 7/00
[52] U.S. Cl. .................. 423/445 B; 423/462; 423/508; 423/511; 423/DIG. 39
[58] Field of Search .................. 423/445 B, DIG. 39, 423/414, 462, 508, 511

[56] References Cited

U.S. PATENT DOCUMENTS

| | | | |
|---|---|---|---|
| 5,278,239 | 1/1994 | Hoxmeier | 525/232 |
| 5,281,653 | 1/1994 | Thomann et al. | 524/490 |
| 5,292,813 | 3/1994 | Patil et al. | 525/240 |
| 5,302,681 | 4/1994 | McClain | 526/340.2 |

OTHER PUBLICATIONS

Tebbe et al., "Synthesis & Single Crystal X-Ray Structure of a Highly Symmetrical $C_{60}$ Derivative, $C_{60}Br_{24}$" Science, vol. 256, May 8, 1992 pp. 822–825.

Taylor et al. "The Chemistry of Fullerenes" *Nature* vol. 363, Jun. 24, 1993, pp. 685–693.

*Primary Examiner*—Michael Lewis
*Assistant Examiner*—Stephen G. Kalinchak
*Attorney, Agent, or Firm*—Linda M. Scuorzo

[57] ABSTRACT

The invention relates to a composition that is the reaction of a fullerene containing at least one corrannulene ring structure and $Y_2X_2$, wherein Y is Se or S, and X is Cl or Br. Generally, these compounds may be represented by the formula $C^f_n X_6 Y_2$ or more particularly $C^f_n X_5(YYX)$. In the formula $C^f_n$ more specifically, is a fullerene having at least one corrannulene ring structure. The compositions may be made by reacting fullerenes with $Se_2X_2$ or $S_2X_2$ wherein X is Cl or Br, preferably in liquid form and preferably heated for a time sufficient to produce the novel compositions. The compositions may be isolated in crystalline form by precipitation with a solvent such as hexane. In crystalline form the compositions may be represented by the generic formula $C^f_n X_8 Y_4$, or more particularly, $C^f_n X_5(YYX) \cdot m Y_2 X_2$ because in crystalline form the compositions are typically associated with $.m Y_2 X_2$ molecules wherein m is an integer at least equal to 1. The compositions have utility as crosslinking agents and lubricating oil and polymer additives, particularly as vulcanizing agents.

9 Claims, 3 Drawing Sheets

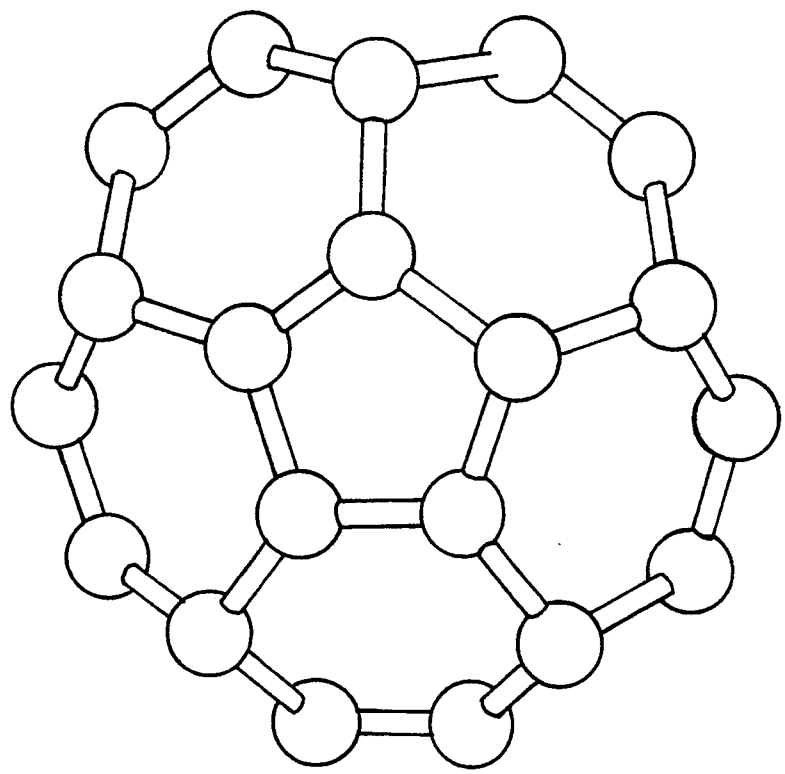
F I G. 1

FULLERENE COMPOSITIONS AND PREPARATION

FIELD OF THE INVENTION

The invention relates to certain substituted fullerene compositions and the method of making them.

SUMMARY OF THE INVENTION

The present invention provides for novel S- and Se-containing fullerenes, the method of making them and the products produced by the processes disclosed herein. The novel fullerene compositions may be represented generically by the formula $C^f_n X_6 Y_2$, or more particularly by the formula $C^f_n X_5 Y_2 X$ wherein $C^f_n$ is a fullerene having at least one corrannulene ring structures or moieties, wherein X is a halogen group selected from the group consisting of Cl and Br and Y is selected from the group consisting of S and Se. The superscript "f" in $C^f_n$ indicates that the allotropic carbon species is a fullerene, and the subscript n may be any positive, even number from 60 that results in a closed cage structure containing C atoms arranged at the vertices of 12 pentagons and at least 20 hexagons, i.e., produces a fullerene. The composition may be prepared by reacting $Y_2X_2$ wherein Y is S or Se and X is Cl or Br with a fullerene. When isolated in crystalline form the composition is normally associated with m molecules of $X_2Y_2$ wherein n is a positive integer at least equal to 1. Thus, the crystalline composition may be represented by the formula $C^f_n X_8 Y_4$ or more particularly $C^f_n X_5 Y_2 X \cdot m Y_2 X_2$. The resulting compositions may be used as vulcanizing agents for natural and synthetic rubbers and in lubrication and polymer additives to induce cross-linking.

BRIEF DESCRIPTION OF THE DRAWINGS

FIG. 1 shows an unsubstituted corrannulene ring structure.

DETAILED DESCRIPTION OF THE INVENTION

Figure 2:
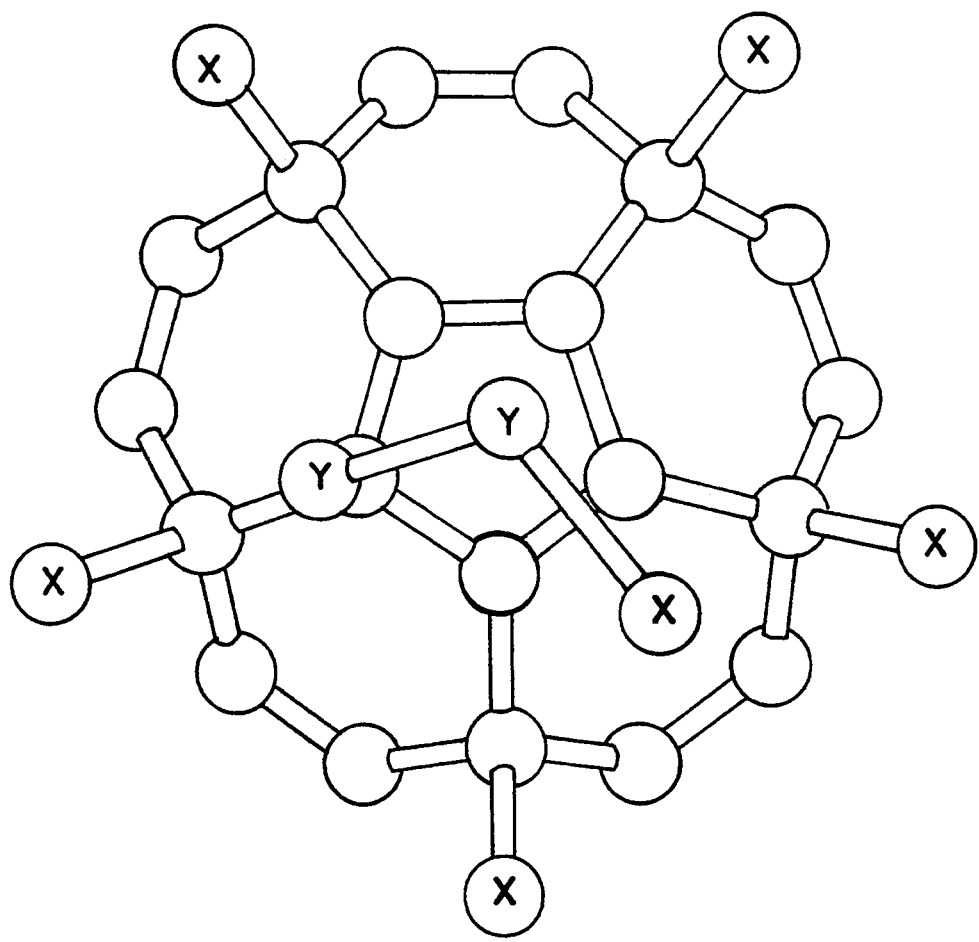
FIG. 2 shows a corrannulene ring structure of a fullerene that is substituted as in the present invention.

Fullerenes are an allotrope of carbon in which the carbon atoms are present in even numbers and are arranged at the vertices of a closed cagelike structure composed of 12 pentagons and at least 20 hexagons. Fullerenes may be synthesized by methods known in the art or purchased commercially. When the fullerenes are present as a mixture of fullerene types, e.g., $C_{60}$, $C_{70}$, $C_{84}$, pure samples of one or more components may be isolated by known methods. For example, $C_{60}$ may be separated from mixtures of $C_{60}$ and other fullerenes by chromatography. $S_2Cl_2$ and $Se_2Cl_2$ may be purchased commercially or synthesized by known methods by direct reaction of the elements. Other starting materials disclosed herein may be purchased commercially.

Suitably any fullerene or fullerenes mixture may be used as a starting material so long as the fullerene contains at least one corrannulene structure. Thus, for example, $C_{60}$, $C_{70}$, $C_{76}$, $C_{78}$, $C_{82}$, $C_{84}$, $C_{90}$, $C_{96}$, $C_{120}$ or larger fullerenes, having the required corrannulene structure, can be used.

The present inventions may suitably comprise, consist or consist essentially of the elements disclosed herein.

A corrannulene ring structure in a fullerene consists of a single five membered (i.e., pentagonally shaped) C ring surrounded by five six-membered (i.e., hexagonally shaped) C rings. See, e.g., Diederich, et al., Acc. Chem. Res. 1992, 25, 19–126, and Miller, Chem. and Ind. 1993, 226–231. There are 12 such substructures in each fullerene. Many of the corrannulene ring structures overlap insofar as they share one or two of the 6-membered C rings between them. FIG. 1 represents an unsubstituted corrannulene ring structure. Typically, fullerenes larger than $C_{60}$ such as $C_{70}$ and higher fullerenes also would be expected to have at least one, more typically two non-overlapping or complete corrannulene ring structures.

The composition of the present invention may be produced by reacting $Y_2X_2$ and a fullerene or mixtures of fullerenes. The product may be represented by the formula $C^f_n X_5 (YYX)$. The X and the (Y_2X) groups are located on the carbon atoms of one corrannulene ring structures in the fullerene. Thus, in the present invention a fullerene for example, $C_{60}$ will contain one such derivatized corrannulene ring structure which contains $X_5(YYX)$. Applicants expect that higher fullerenes may be similarly derivatized using the processes described herein. In the formula Y is selected from the group consisting of S and Se, wherein X is a halogen group, preferably selected from the group consisting of chlorine and bromine, more preferably chlorine, and wherein $C^f_n$ is a fullerene. The composition may be crystallized from solution to form a crystalline structure that typically will have one or at least one $Y_2X_2$ molecule included or associated with the crystal lattice, and thus may be represented by the formula $C^f X_5(YYX) \cdot n(Y_2Cl_2)$ wherein n is at least 1. When contacting the fullerenes with $Y_2X_2$, preferably an excess, more preferably a large excess of $Y_2X_2$ sufficient to form the composition is desirable. As long as an excess of $Y_2X_2$ is present the above product may be isolated in significant and preferential yield. It is preferred to heat the mixture of fullerene and $Y_2X_2$ to facilitate the reaction and reduce reaction time. The reaction may be carried out in a solvent in which the fullerenes may be dissolved, such as toluene, and preferably that is also non-reactive or inert to the process. However, neat $Y_2X_2$, i.e., liquid $Se_2Cl_2$ or $S_2Cl_2$, typically also may be used. Liquid $Y_2X_2$, more specifically liquid $Se_2Cl_2$ and $S_2Cl_{12}$ are preferred although other solvents may be used. Temperatures above the boiling point of $Y_2X_2$ are not recommended. Typically, a temperature of from about 20° C. to about 90° C. may be used to produce a reaction at from about 2 to 30 days. The temperature may be adjusted within the range to maintain the $Y_2X_2$ as a liquid phase at reaction conditions. Excessively high temperatures should be avoided in order to maintain the $Y_2X_2$ in liquid phase and to prevent decomposition of the fullerenes or resulting product.

Figure 3:
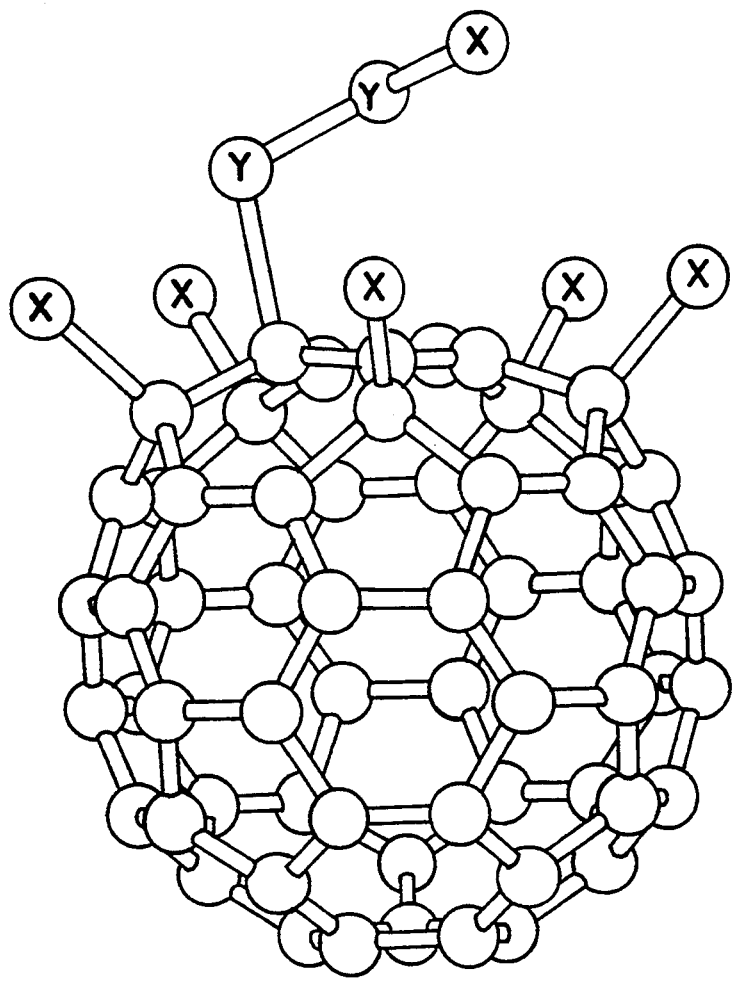
FIG. 3 shows a fullerene structure that is substituted as in the present invention.

Fullerenes have been characterized as having a plurality of corrannulene-like ring structures. Applicants have discovered that it is possible to functionalize a corrannulene ring structure in a fullerene according to the pattern represented, by way of example, in FIG. 2 and 3. The resulting composition will contain five halogen atoms each bonded to the C atom in each of the six-membered C rings of the corrannulene ring structure which is adjacent, i.e., bonded to one of the five C atoms in the central five membered (i.e., $C_5$) carbon ring of that corrannulene ring structure and a —YYX linkage or moiety bonded to one C atom in the five-membered ring of that corrannulene ring structure by the terminal Y atom of the YYX linkage. Shown in FIG. 1, FIG. 2, and FIG. 3, are an unsubstituted corrannulene structure in a fullerene; one embodiment of the present invention represented by a fullerene containing a substituted corrannulene ring structure; and another embodiment of the present invention represented by a substituted $C_{60}$ fullerene, respectively. The —YYX linkage as shown in FIG. 2 may conveniently be located on any one of the five equivalent carbon atoms in the five membered carbon ring of the corrannulene ring structure. Thus according to the process of the present invention it is possible to produce fullerenes in which one corrannulene ring structure is derivatized.

The composition may be isolated by crystallization from solution upon addition of a suitable precipitating agent, such as hexane or other aliphatic solvents.

EXAMPLES

Example 1—Synthesis of $C_{60}$ $Cl_5(SSCl) \cdot S_2Cl_2$ $C_{60}$ fullerene (108 mg, 0.15 mmol) was added to 15 mL of $S_2Cl_2$. The mixture was stirred and the $C_{60}$ rapidly entered the solution. The solution was heated at 60° C. for four days. The color of the solution changed from dark red-brown to red-orange. After filtering the solution, hexane was layered on top and allowed to diffuse into the solution over several days. Red-orange crystals of $C_{60}Cl_5(SSCl)$ deposited on the sides of the flask in 88% (149 mg) yield. The crystals were characterized by single crystal X-ray crystallography. The data was collected on an Enraf-Nonius CAD4 diffractometer and solved with the SHELXTL crystallographic software. The compound was found to consist of a $C_{60}Cl_5(SSCl)$ moiety with an $S_2C_2$ molecule included in the crystal lattice. Crystallographic details are listed in Table I.

TABLE I

| Crystallographic Details | |
| --- | --- |
| compound | $C_{60}Cl_5(SSCl) \cdot S_2Cl_2$ |
| formula | $C_{60}Cl_8S_4$ |
| formula weight | 1132 |
| space group | $P2_1/c$ |
| a, Å | 11.661(2) |
| b, Å | 19.264(4) |
| c, Å | 17.573(4) |
| β, deg. | 95.05(3) |
| V, Å$^3$ | 3932(1) |
| Z | 4 |
| d(calc.), g/cm$^3$ | 1.913 |
| t, °C. | 20 |
| λ, Å | 0.7093 (Mo K$_{\alpha}$1) |
| transmission coefficient | 0.863–0.936 |
| no. of unique data | 7705 |
| no. of data with F > 4σ(F) | 5377 |
| no. of variables | 668 |
| R(F) | 0.071 |
| R$_w$(F) | 0.087 |

TABLE I-continued

| Crystallographic Details | |
| --- | --- |
| goodness of fit | 1.70 |

What is claimed is:

1. A fullerene composition comprising the reaction product of a fullerene containing at least one corrannulene ring structure and $Y_2X_2$, wherein Y is selected from the group consisting of Se and S, and X is selected from the group consisting of Cl and Br.

2. The composition of claim 1 wherein the fullerene is selected from the group consisting of $C_{60}$, $C_{70}$, $C_{76}$, $C_{78}$, $C_{82}$, $C_{84}$, $C_{90}$, $C_{96}$, $C_{120}$ and mixtures thereof.

3. The composition of claim 1 wherein the reaction product has the formula $C_{60}Cl_5(SSCl)$.

4. The composition of claim 1 wherein the reaction product has the formula $C_fn Cl_5(SSCl) \cdot mS_2Cl_2$ wherein m is an integer at equal to at least 1 "and wherein n is selected from the group consisting of 60, 70, 76, 78, 82, 84, 90, 96 and 120".

5. A fullerene composition represented by the formula $C_fn X_5(YYX)$ wherein $C_fn$ is a fullerene "wherein n is selected from the group consisting of 60, 70, 76, 78, 82, 84, 90, 96 and 120", wherein X is a halogen selected from the group consisting of Cl and Br and wherein Y is selected from the group consisting of Se and S.

6. The composition of claim 5 associated with $m(Y_2X_2)$ molecules, wherein m is an integer at least equal to 1.

7. A fullerene composition containing a substituted corrannulene ring structure represented by the formula

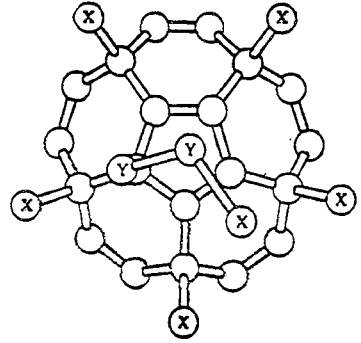

wherein X is a halogen selected from the groups consisting of Cl and Br, and wherein Y is selected from the group consisting of Se and S.

8. A method of making substituted fullerenes, comprising contacting a fullerene having carbon atoms forming corrannulene ring structures, with $Y_2X_2$ wherein Y is selected from the group consisting of Se and S and wherein X is selected from the group consisting of Cl and Br to produce a product having the formula $C_fn X_5$ (YYX) wherein $C_fn$ is a fullerene with n carbon atoms, Y is selected from the group consisting of Se and S and X is selected from the group of Cl and Br and wherein $X_5$ and (YYX) are bonded to the carbon atoms of a corrannulene ring structure.

9. The method of claim 8 wherein the $Y_2X_2$ is added in substantial excess of the fullerene.

* * * * *